United States Patent
Ortseifen et al.

(10) Patent No.: US 10,315,656 B2
(45) Date of Patent: Jun. 11, 2019

(54) METHOD OF CONTROLLING A MOTOR VEHICLE

(71) Applicant: FORD GLOBAL TECHNOLOGIES, LLC, Dearborn, MI (US)

(72) Inventors: Andreas Ortseifen, Eschweiler (DE); Urs Christen, Aachen (DE); Stephan Strahl, Herzogenrath (DE); Nicholas Dashwood Crisp, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/467,195

(22) Filed: Mar. 23, 2017

(65) Prior Publication Data

US 2017/0282920 A1 Oct. 5, 2017

(30) Foreign Application Priority Data

Mar. 31, 2016 (EP) .................................. 16163087

(51) Int. Cl.
*B60W 10/02* (2006.01)
*B60W 10/06* (2006.01)
*B60W 30/182* (2012.01)
*B60W 30/18* (2012.01)
*B60W 50/10* (2012.01)
(Continued)

(52) U.S. Cl.
CPC .......... *B60W 30/182* (2013.01); *B60W 10/02* (2013.01); *B60W 10/06* (2013.01); *B60W 30/18027* (2013.01); *B60W 30/18072* (2013.01); *B60W 30/20* (2013.01); *B60W 50/10* (2013.01); *F16D 48/00* (2013.01); *B60W 2510/0208* (2013.01); *B60W 2540/10* (2013.01); *B60W 2710/021* (2013.01); *B60W 2710/065* (2013.01); *B60W 2710/0644* (2013.01);
(Continued)

(58) Field of Classification Search
CPC ................. B60W 10/02; B60W 10/06; B60W 30/18072; B60W 30/182; B60W 30/20; B60W 2710/021; B60W 2710/0644; B60W 2710/0666; F16D 48/06
See application file for complete search history.

(56) References Cited

U.S. PATENT DOCUMENTS

| 6,574,535 B1 | 6/2003 | Morris et al. |
| 2001/0008899 A1 | 7/2001 | Russell et al. |

(Continued)

FOREIGN PATENT DOCUMENTS

RU 2012125158 A 12/2013

OTHER PUBLICATIONS

European Search Report dated Oct. 17, 2016 for corresponding Application No. 16163087.6, 7 pages.

*Primary Examiner* — Edwin A Young
(74) *Attorney, Agent, or Firm* — David Kelley; Brooks Kushman, P.C.

(57) ABSTRACT

A method of controlling the operating mode of a motor vehicle includes transitioning between driving and coasting modes and vice-versa automatically in response to a driver trigger. The method controls an engine of the motor vehicle to bring a driveline driven by the engine via an electronically controlled clutch into a lash state before engaging or disengaging the electronically controlled clutch thereby preventing driveline disturbances from being produced by the transition.

20 Claims, 9 Drawing Sheets

(51) Int. Cl.
   *B60W 30/20*   (2006.01)
   *F16D 48/00*   (2006.01)

(52) U.S. Cl.
   CPC .. *B60W 2710/0666* (2013.01); *B60Y 2300/42* (2013.01); *F16D 2500/5085* (2013.01); *Y02T 10/76* (2013.01)

(56) References Cited

U.S. PATENT DOCUMENTS

| | | |
|---|---|---|
| 2013/0035830 A1 | 2/2013 | Finizio et al. |
| 2013/0096789 A1 | 4/2013 | McDonnell et al. |
| 2013/0296124 A1* | 11/2013 | Pietron ................. B60W 20/40 477/5 |
| 2013/0296136 A1* | 11/2013 | Doering .................. B60K 6/48 477/167 |
| 2014/0365094 A1* | 12/2014 | Cunningham ........ B60W 10/02 701/68 |
| 2015/0046050 A1 | 2/2015 | Christensen et al. |

\* cited by examiner

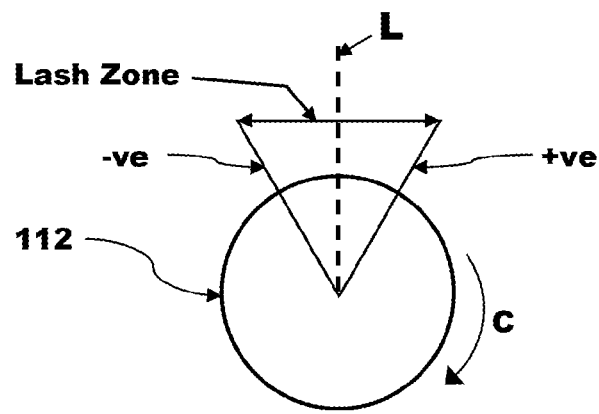
Fig.2B
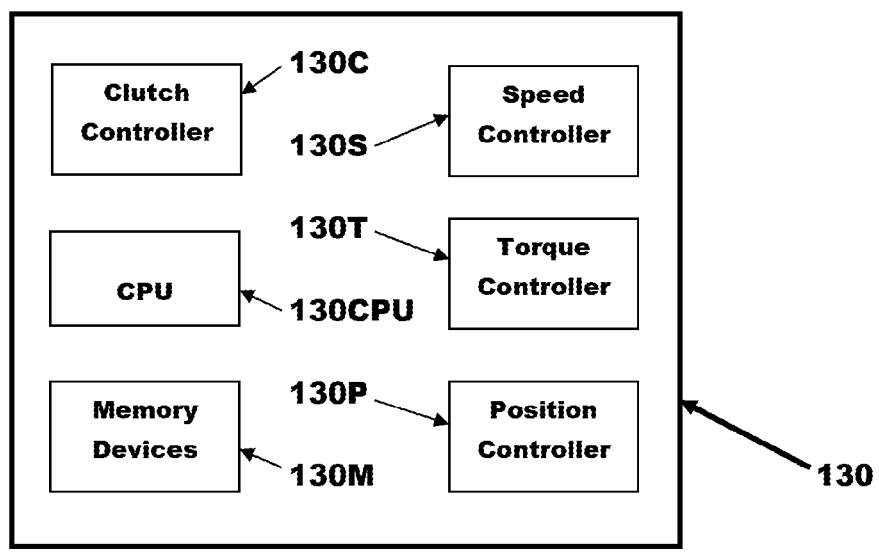
Fig.2C

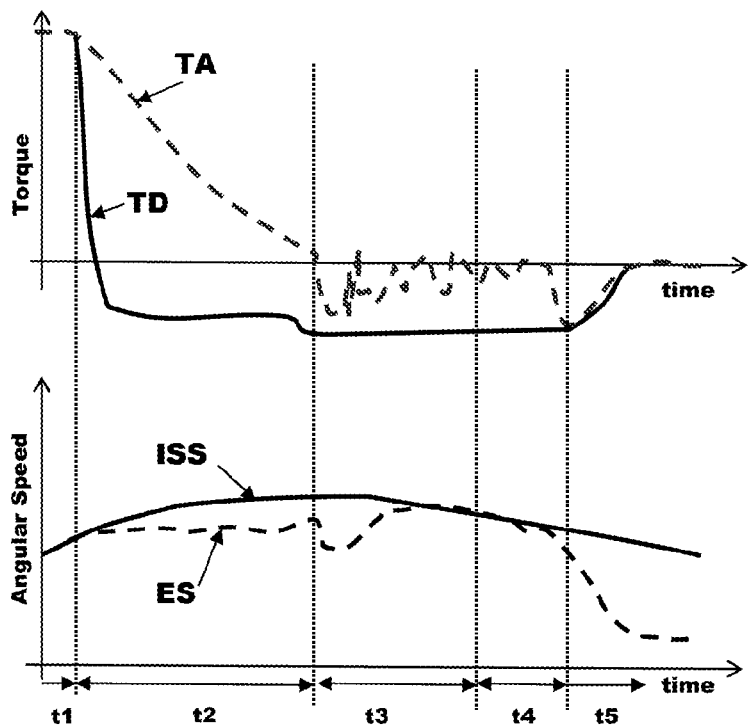
Fig.4a
Fig.4b
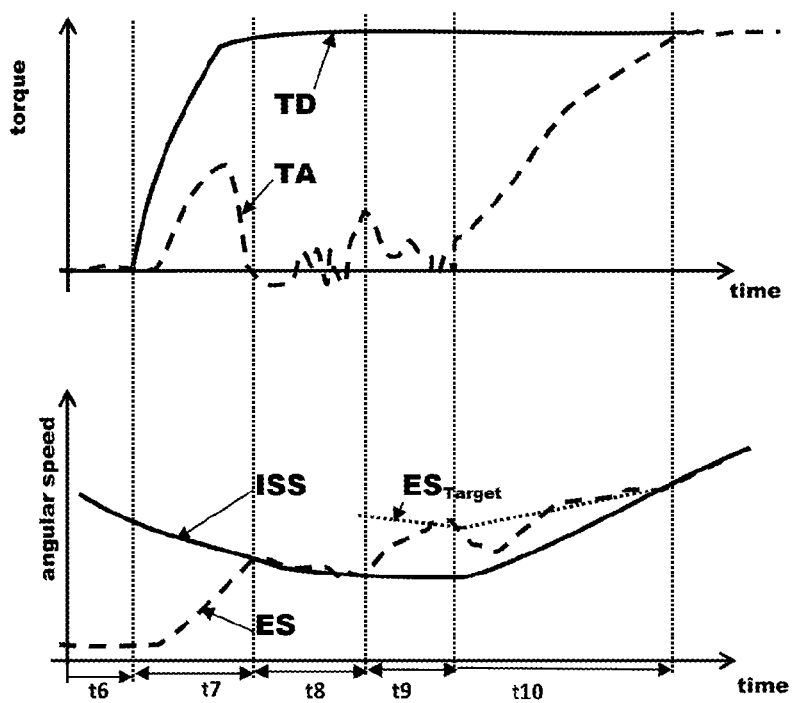
Fig.5a
Fig.5b

METHOD OF CONTROLLING A MOTOR VEHICLE

CROSS-REFERENCE TO RELATED APPLICATIONS

This application claims foreign priority benefits under 35 U.S.C. § 119(a)-(d) to EP Application 16163087.6 filed Mar. 31, 2016, which is hereby incorporated by reference in its entirety.

TECHNICAL FIELD

This invention relates to controlling the operation of an engine and driveline of a motor vehicle and, in particular, to controlling the engagement and disengagement of an electronically controlled clutch to effect the transition of the motor vehicle into and out of a coasting mode of operation.

BACKGROUND

Vehicle coasting is a vehicle state or mode of operation in which a motor vehicle operates with a clutch used to connect an engine of the motor vehicle to a driveline of the motor vehicle in a disengaged state so that the motor vehicle moves without being decelerated by engine drag. During such coasting it is usual for the engine to be operated at idle speed in order to save fuel and reduce emission although, in some cases, the engine is automatically stopped during coasting.

The transition from a driving mode such as vehicle acceleration to coasting or vice versa requires several steps to be executed and, if the motor vehicle is equipped with an electronically controlled clutch (E-clutch), the transition can be automated in a process known as 'autonomous coasting' in which the driver does not actively produce the conditions required for coasting but rather the actions of the driver are used to automatically trigger the entry and exit from a state of coasting.

To meet customer drivability expectations, driveline surge or shuffle caused by torsional oscillations in the driveline during such an automatic transition need to be avoided. This requires a control strategy to be used designed to reduce such shuffle or torsional oscillations, however, the design of such a control strategy is not a trivial matter because it must take into account both driveline backlash and driveline compliance.

Driveline backlash consists of free travel between gears and other parts throughout the driveline such that changing the direction of rotational movement will result in lost motion referred to as the 'lash zone'. When in the lash zone the driveline is said to be in a lash state and no torque can be transmitted by the driveline as the driveline travels through a lash zone. However as soon as the driveline lash zone has been crossed a large torque is immediately transmitted by the driveline and this abrupt change in transmitted torque results in a system response that will result in shuffle unless it is controlled by the control strategy.

Driveline compliance increases the control challenge because the application of torque to the various shafts of the driveline cause them to get twisted or wound up and this wind-up has to be released in a controlled manner in order to avoid uncontrolled travel through the lash zone when transitioning from positive wind-up to negative wind-up or vice-versa.

It is a problem that, in the case of a powertrain having a manual transmission and an E-clutch an automated transition from one driveline mode such as acceleration to coasting or vice versa will, due to driveline backlash and driveline wind-up, result in an uncontrolled transition causing jerks and longitudinal vehicle shuffle if a control strategy taking no account of wind-up and compliance is used to effect the transition.

SUMMARY

It is an object of this invention to provide a method and control system to provide a smooth automated transition into and out of vehicle coasting.

According to a first aspect of the invention there is provided a method of controlling the transition of a motor vehicle having an engine driveably connected to an input of a driveline of the motor vehicle via an electronically controlled clutch into and out of a coasting mode of operation to minimize driveline shuffle characterized in that, when the motor vehicle is in a drive mode of operation, it is automatically transitioned to the coasting mode of operation in response to an indication that coasting is desirable by controlling the engine to move the driveline into a lash state in which no torque is being transmitted by the driveline and, when the driveline is in the lash state, automatically disengaging the electronically controlled clutch and operating the motor vehicle in the coasting mode of operation.

The indication that coasting is desirable may be a tip-out of torque demand by a driver of the motor vehicle.

Controlling the engine to move the driveline into a lash state may comprise reducing the torque output from the engine to reduce wind-up in the driveline and, after the wind-up in the driveline has been eliminated, controlling the rotational speed of the engine to move the driveline into the lash state.

The method may further comprise controlling the rotational speed of the engine to maintain the driveline in the lash state for a minimum period of time before engaging the electronically controlled clutch.

The method may further comprise controlling the rotational speed of the engine to reduce the rotational speed of the engine to idle speed when the motor vehicle is in the coasting mode of operation.

The method may further comprise shutting-down the engine when in the coasting mode of operation.

The method may further comprise, in response to a request for positive drive, automatically transitioning the motor vehicle from the coasting mode of operation to the drive mode of operation by:
   controlling the rotational speed of the engine to synchronize it with a rotational speed of the input to the driveline; and
   when the rotational speed of the engine and the rotational speed of the input to the driveline are synchronized, engaging the electronically controlled clutch; and
   when the electronically controlled clutch has been engaged, increasing the torque output from the engine in a controlled manner to produce wind-up in the driveline; and
   continuing to increase the torque output from the engine until a predefined level of torque has been attained; and
   when the predefined level of torque has been attained, operating the motor vehicle in the drive mode of operation.

Alternatively, the method may further comprise, in response to a request for drive, automatically transitioning the motor vehicle from the coasting mode of operation to the drive mode of operation by:
   starting the engine; and controlling the rotational speed of the engine to synchronize it with a rotational speed of the input to the driveline; and when the rotational speed of the engine and the rotational speed of the input to the driveline are synchronized, engaging the electronically controlled clutch; and when the electronically controlled clutch has been engaged, increasing the torque output from the engine to produce wind-up in the driveline; and continuing to increase the torque output from the engine until a predefined level of engine torque has been attained; and when the predefined level of engine torque has been attained, operating the motor vehicle in the drive mode of operation.

The request for positive drive may be a tip-in of torque demand by a driver of the motor vehicle.

The method may further comprise, in response to a request for engine braking, automatically transitioning the motor vehicle from the coasting mode of operation to a resistive drive mode of operation by:

controlling the rotational speed of the engine to synchronize the rotational speed of the engine with a rotational speed of the input to the driveline; and when the engine and the input to the driveline are synchronized, engaging the electronically controlled clutch; and when the electronically controlled clutch is engaged, reducing a torque request to the engine to zero; and operating the motor vehicle in the resistive drive mode of operation.

The driveline may include a manual gearbox having an input shaft driveably connected to the engine via the electronically controlled clutch and the input shaft may form the input to the driveline.

According to a second aspect of the invention there is provided an autonomous coasting control system of a motor vehicle having an engine driveably connected to an input to a driveline of the motor vehicle, the control system comprising an electronically controlled clutch to selectively provide drive from the engine to the driveline, an electronic controller to control the operation of the engine and the engagement state of the electronically controlled clutch and an accelerator pedal sensor to provide an input to the electronic controller indicative of a driver torque demand characterised in that the electronic controller is arranged to automatically transition the motor vehicle from a drive mode of operation to a coasting mode of operation when the input from the accelerator pedal sensor indicates that a torque demand tip-out has occurred by:

controlling the engine to move the driveline into a lash state in which no torque is being transmitted by the driveline; and when the driveline is in the lash state, automatically disengaging the electronically controlled clutch to enter the coasting mode of operation.

The electronic controller may be further operable to decrease in a controlled manner the torque output from the engine when the input from the accelerator pedal sensor indicates that a torque demand tip-out has occurred to remove wind-up from the driveline and when the wind-up has been removed from the driveline, control the rotational speed of the engine to move the driveline into the lash state.

The electronic controller may be further arranged to transition the motor vehicle from the coasting mode of operation to the drive mode of operation in response to an input from the accelerator pedal sensor indicating that a torque demand tip-in has occurred by:

controlling the rotational speed of the engine to synchronize it with a rotational speed of the input to the driveline; and when the rotational speed of the engine and the rotational speed of the input to the driveline are synchronized, engage the electronically controlled clutch; and when the electronically controlled clutch has been engaged, increase the torque output from the engine in a controlled manner to produce wind-up in the driveline; and continue to increase the torque output from the engine until a predefined level of torque has been attained; and when the predefined level of torque has been attained, operate the motor vehicle in the drive mode of operation.

The electronic controller may be arranged to detect an impact signature indicating that the driveline has traversed from the lash state to a non-lash state.

The impact signature may be one of a characteristic spike and a change in magnitude of engine torque that is detected by the electronic controller.

According to a third aspect of the invention there is provided a motor vehicle having an autonomous coasting control system constructed in accordance with second aspect of the invention.

BRIEF DESCRIPTION OF THE DRAWINGS

FIG. 2B is a schematic end view of an input shaft to a gearbox forming part of the driveline of the motor vehicle shown in FIG. 2A showing a driveline lash zone;

FIG. 2C is a block diagram of an electronic controller forming part of the control system shown in FIG. 2A;

FIGS. 4A and 4B are charts relating Torque and Angular Speed respectively against time for the transition from the vehicle driving mode of operation to the vehicle coasting mode shown in FIG. 3;

FIGS. 5A and 5B are charts relating Torque and Angular Speed respectively against time for the transition from the vehicle coasting mode to the vehicle driving mode shown in FIG. 3;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
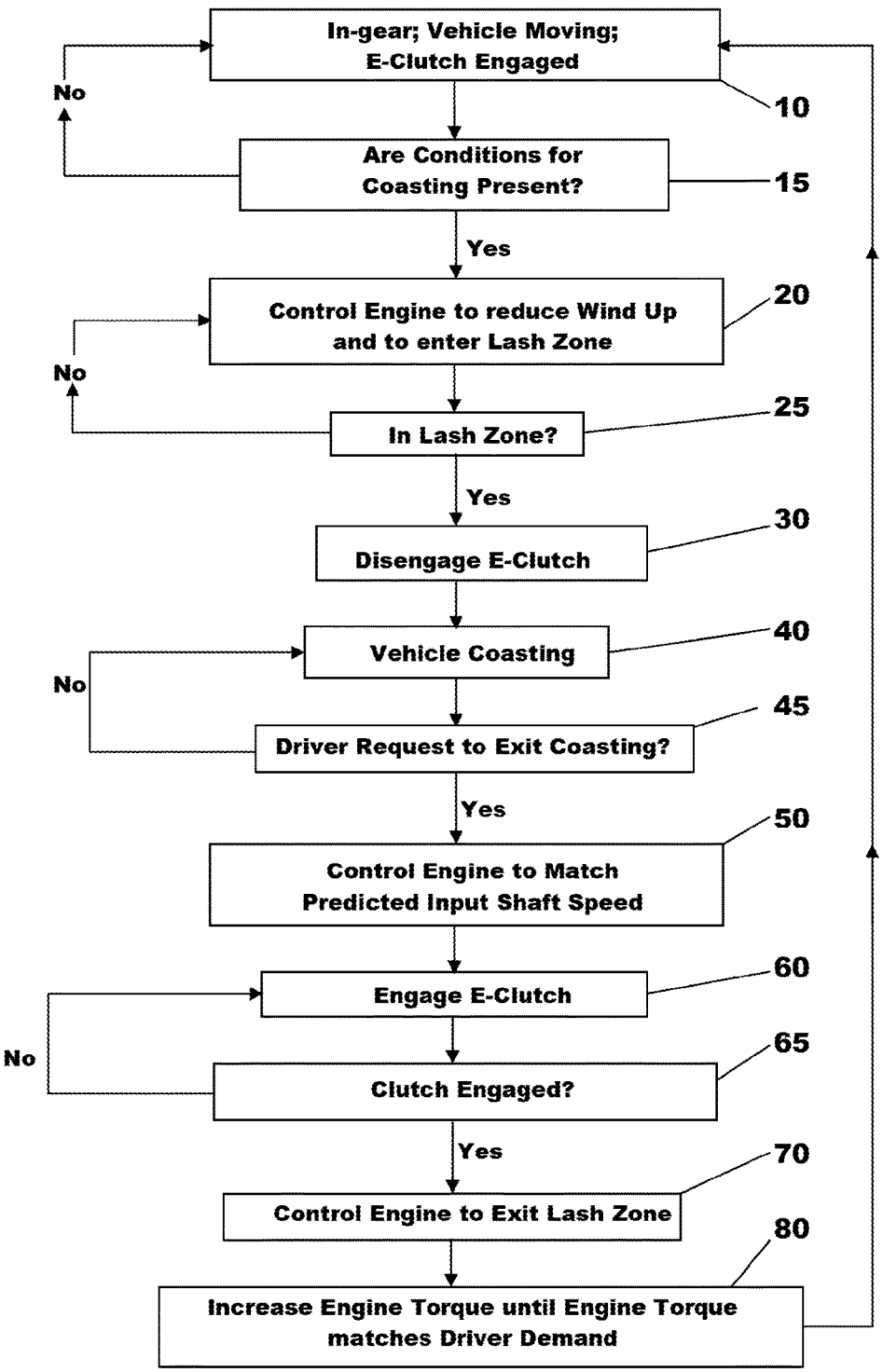
FIG. 1 is a high level flow chart of a method of controlling the transition of a motor vehicle having an engine driving a driveline via an electronically controlled clutch into and out of a coasting mode of operation in accordance with a first aspect of the invention.

With reference to FIG. 1 there is shown a method of controlling the transition from a drive mode of operation to a coasting mode of operation for a motor vehicle having an electronically controlled clutch (E-clutch) interposed between a combustion engine and a driveline of the motor vehicle having a manual transmission.

As will be described in more detail hereinafter, in the drive mode of operation an engine of the motor vehicle drives a driveline of the motor vehicle through an engaged clutch and in the coasting mode of operation the clutch is disengaged and the engine is either idling or stopped.

The method starts in box 10 where the gearbox is in gear, the E-clutch is in an engaged state and the motor vehicle is moving.

The method advances to box 15 where it is checked whether the conditions for autonomous coasting are present.

In the case of this example these conditions comprise:
the driver has removed their foot from an accelerator pedal of the motor vehicle (a torque tip-out event); and
The driver is not pressing a clutch pedal of the motor vehicle to manually disengage the E-clutch; and
The motor vehicle is travelling above a minimum permitted vehicle speed below which autonomous coasting is not permitted.

If all three of these conditions are present, the method advances to box 20 otherwise it returns to box 10 and will loop around boxes 10 and 15 until the three conditions are met.

In box 20 the engine is controlled to reduce wind-up in the driveline by reducing the torque supplied by the engine in a controlled manner by ramping down a torque demand to the engine and, when all of the wind-up in the driveline has been removed a lash zone (See FIG. 2B) is entered in which no torque is being transferred from the engine to the driveline or vice-versa.

To enter the lash zone from an engine driving state requires the rotational speed of the engine to be slightly less than the rotational speed of a notional input shaft to the gearbox for a small period of time. That is to say based upon the current speed of the motor vehicle a rotational speed of an input shaft (notional input shaft) can be calculated. When drive is being transmitted via the driveline the rotational speed of the actual input shaft and the rotational speed of the notional input shaft are identical but when the driveline is in the lash zone a small difference can exist as the driveline traverses across the lash zone.

As shown in boxes 25 and 30, after the lash zone has been entered, the E-clutch is automatically disengaged thereby disconnecting the engine from the rest of the driveline.

If in box 25 it is determined that the lash zone has not been entered the method returns to box 20 and will cycle around boxes 20 and 25 until the test in box 25 is passed.

After the E-clutch has been automatically disengaged in box 30 the motor vehicle MV enters an autonomous coasting mode as shown in box 40. In the autonomous coasting mode, the engine of the motor vehicle can be allowed to operate at idle speed or can be automatically stopped.

The motor vehicle MV will remain in the autonomous coasting state until the driver requests coasting be exited as shown in box 45.

It will be appreciated that several other events could cause the exiting of autonomous coasting such as, for example, vehicle acceleration exceeding a predefined limit when coasting downhill, the driver pressing the clutch pedal of the motor vehicle, the driver pressing a brake pedal of the motor vehicle or the vehicle speed dropping below the minimum permitted vehicle speed. It will be appreciated that the minimum permitted vehicle speed is dependent upon the gearbox ratio currently selected and the final drive ratio of the driveline. That is to say, the minimum permitted vehicle speed is set such that the rotational speed of the input shaft to the gearbox is slightly greater than or at least equal to an expected idle speed of the engine.

Referring back to box 45, in the case of this example a driver request to exit autonomous coasting is a request for torque from the engine by depressing the accelerator pedal (a torque tip-in event).

When a driver request to end autonomous coasting occurs the method advances from box 45 to box 50 where the engine speed is controlled prior to engagement of the E-clutch to match a predicted rotational speed of the actual input shaft to the gearbox after the E-clutch has been engaged. It will be appreciated that the vehicle speed is normally reducing during coasting and so the predicted rotational speed may be less than the current speed.

When the engine speed matches the predicted rotational speed of the input shaft to the gearbox (rotational speed of notional input shaft), the method advances from box 50 to box 60 and the E-clutch is engaged and, when checked in box 65 it is confirmed that it is engaged, the method advances from box 65 to box 70.

In box 70 the speed of the engine is gradually increased by, for example, controlling to a setpoint using a closed loop speed controller to cause the lash zone to be traversed at a predefined speed and when the backlash has been taken up, indicated by a distinctive increase in engine torque referred to as an impact signature, the method advances from box 70 to box 80.

In box 80 the torque supplied by the engine is ramped up or increased in a controlled manner to wind-up the driveline until, when the torque being supplied by the engine matches a current torque demand from a driver of the motor vehicle, control of the engine reverts to the driver and the autonomous coasting method has completed a single cycle and has returned to box 10.

The method will cycle through boxes 10 to 80 until a vehicle 'Key-off' event occurs, a predefined exit condition is present or the driver intervenes by, for example depressing the clutch pedal.

With particular reference to FIGS. 2A to 2D there is shown a motor vehicle "MV" having a pair of un-driven wheels 101, a pair of driven wheels 102, an engine 100 having a crankshaft forming an output 104 driving an electronically controlled clutch (E-clutch) 105, a first driveline shaft in the form of a gearbox input shaft 112, that transmits drive from the E-clutch 105 to a manual gearbox 110, a second driveline shaft 114 in the form of a gearbox output shaft that transmits drive from the gearbox 110 to a differential 120 and a pair of half shafts 121 that transfer drive from the differential 120 to the driven wheels 102.

The E-clutch 105 comprises a dis-engageable clutch and one or more electronically controllable actuators used to engage or disengage the clutch.

It will be appreciated that the invention is not limited to a rear wheel drive motor vehicle and can be applied with benefit to other layouts such as, for example, front wheel drive and all wheel drive.

A control system comprising a central electronic powertrain controller 130 is used to control the operation of the E-clutch 105 and the engine 100, the engine 100, the E-clutch 105 and the electronic controller 130 forming the primary components of an autonomous coasting control system.

The electronic controller 130 receives an input 131 indicative of the rotational speed of the engine 100 and supplies one or more commands 132 to the engine 100 used to control the speed and torque produced by the engine 100.

The electronic controller 130 also receives an input 133 indicative of vehicle speed from a wheel speed sensor 103, an input 134 indicative of the current selected gear in the gearbox 110 from a selected gear sensor 111, an input 135 from a clutch pedal position sensor 140 indicative of the position of a clutch pedal, an input 136 from an accelerator pedal position sensor 150 indicative of the position of an accelerator pedal and an input 137 from a brake pedal position sensor 160.

The electronic controller 130 provides a control output 138 to the E-clutch 105 which is used to control the engagement state of the E-clutch 105. It will be appreciated that there is no mechanical connection between the clutch pedal and the E-clutch 105 and that the depressing of the clutch pedal by a driver of the motor vehicle MV is sensed by the clutch pedal sensor 140 and is used by the electronic controller 130 to control the engagement state of the E-clutch 105 based upon the input it has received. The releasing of the clutch pedal from a fully depressed condition by the driver will cause the electronic controller 130 to engage the E-clutch 105 and vice-versa.

It will be appreciated that the E-clutch 105 can be engaged and disengaged by various types of actuator under the control of the electronic controller 130 such as, for example and without limitation, electric actuators, electro-hydraulic actuators and electro-pneumatic actuators.

The E-clutch 105 can also be autonomously controlled by the electronic controller 130 as will be described hereinafter. 'Autonomous' as meant herein means that the control or action taking place is not dependent directly on the actions of the driver but rather is conducted in an automatic manner in response to one or more triggers.

Figure 2A:
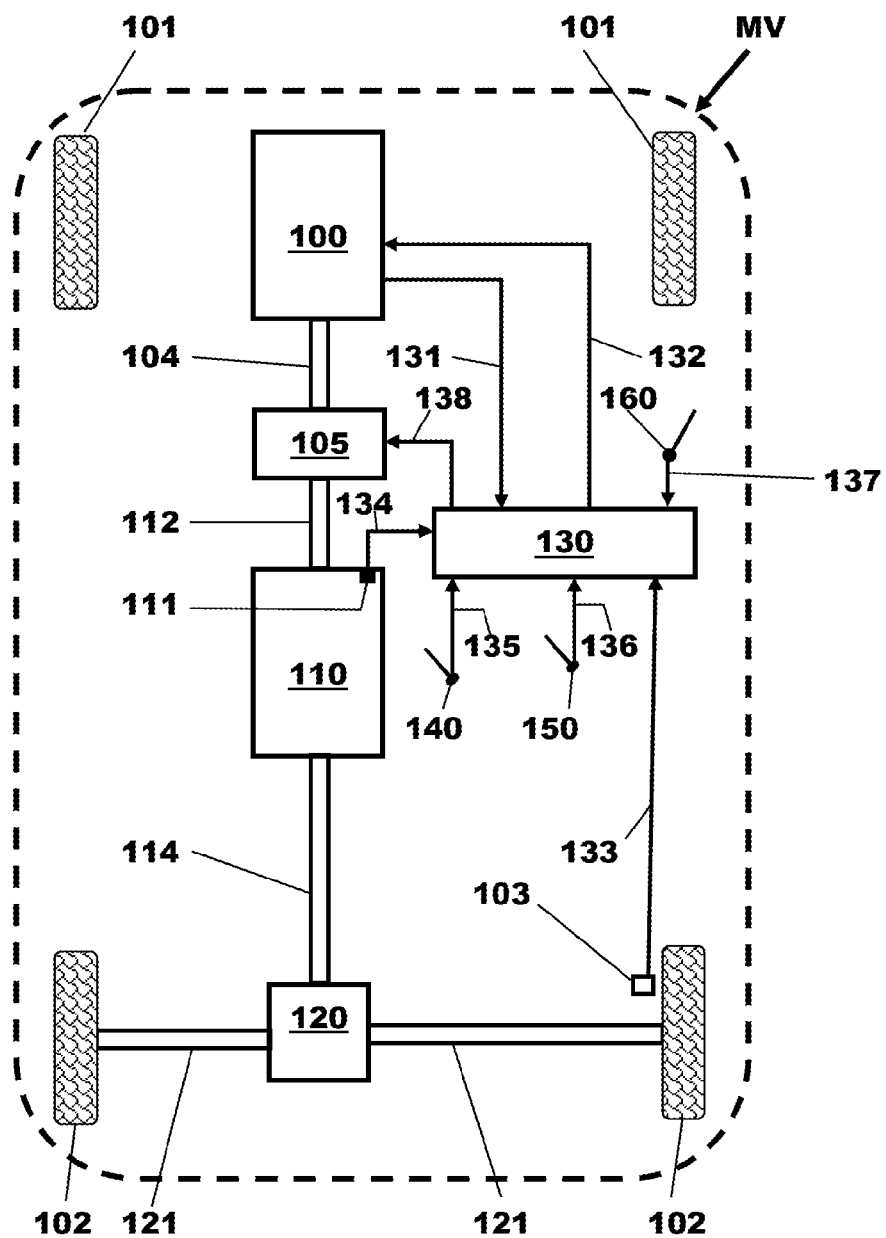
FIG. 2A is a diagrammatic plan view of a motor vehicle having an engine driveably connected via an electronically controlled clutch to a driveline and a control system used to control the transitioning of the motor vehicle into and out of a coasting mode of operation.

As shown in FIG. 2C the electronic controller 130 includes a central processor unit 130CPU, a number of memory devices 130M, a clutch controller 130C, an engine speed controller 130S, and engine torque controller 130T and a position controller 130P used to control a relative angle between the crankshaft of the engine 100 and the notional input shaft. It will be appreciated that these various constituent parts of the electronic controller 130 can be formed by hardware, software or firmware or a combination these. It will also be appreciated that the electronic controller 130 can be formed by more than one unit and that the invention is not limited to the specific electronic architecture shown in FIGS. 2A and 2C.

The autonomous coasting control system operates to transition the motor vehicle MV between drive and coasting modes of operation while minimising shuffle or torsional oscillations. This is achieved by only allowing the E-clutch 105 to be engaged or disengaged when there is no wind-up in the driveline and the driveline is in the lash zone and is enhanced by controlling the rate of build-up or rate of reduction of wind-up in the driveline by controlling the rate of change of torque provided by the engine 100.

In FIG. 2B there is shown an end view of the input shaft 112 to the gearbox 110 showing how the backlash in all of the driveline components from the input shaft 112 to the driven wheels 102 can be referred back to produce a lash zone bounded by a negative lash limit (−ye) and a positive lash limit (+ve). A reference line on the input shaft 112 is indicated by an extended line 'L' and is shown in a mid-lash position in FIGS. 2B and 2D. Clockwise is shown on FIGS. 2B and 2D by the arrows "C".

When the engine 100 provides driving torque it will cause a clockwise turning moment to be applied to the gearbox input shaft 112 causing the gearbox input shaft 112 to rotate in a clockwise direction from the mid-lash position shown.

Until the backlash has been taken up no torque will be transferred to the driven wheels 102 however when the backlash has been absorbed the gearbox input shaft 112 will have rotated such that the reference line 'L' is located at the positive lash limit (+ve). Drive will then begin to be transmitted to the driveline. Initially the drive will result in continued clockwise rotation of the input shaft 112 with no significant rotation of the driven wheels 102 due to wind-up in the shafts 114, 121 until the applied torque reaches a level sufficient to cause forward movement of the motor vehicle MV.

During forward driving of the motor vehicle MV the input shaft 112 will remain at the +ve limit of lash zone while torque continues to be transmitted from the engine 100 to the input shaft 112.

It will be appreciated that all the backlash in the driveline is present downstream from the gearbox input shaft 112 that is to say, between the gearbox input shaft 112 and the driven wheels 102.

When the supply of torque from the engine 100 is reduced the first effect is for the wind-up in the driveline to be correspondingly reduced. If the magnitude of torque is reduced sufficiently all of the wind-up will be removed from the driveline and if the effect is that the driveline overruns the engine 100 the lash zone will be traversed until eventually the reference line 'L' will lie on the negative lash limit (−ye). During the traversing of the lash zone no torque can be transmitted by the driveline and it is said to be in a 'lash state' or 'state of lash'.

Therefore, in summary, when the engine 100 is driving the driveline all of the backlash in the driveline will be absorbed and the reference line 'L' will lie at the +ve end of the lash zone and when the engine is being driven by the driveline such as in an engine braking situation, all of the backlash will have been absorbed and the line 'L' will have moved to the −ye end of the lash zone.

It will be appreciated for any particular selected gear ratio in the gearbox 110 there will be a fixed calculable speed ratio between the driven wheels 102 and a notional input shaft to the driveline. When the engine 100 driving the motor vehicle MV and the torque supplied by the engine 100 is substantially constant, the rotational speed of the notional input shaft and the actual gearbox input shaft 112 will be the same. However, when the driveline is traversing the lash zone, there will be a small speed difference between the rotational speed of the actual gearbox input shaft 112 and the notional input shaft due to the absorption of the backlash in the driveline. The rotational speed of the notional input shaft is equal to the vehicle speed referred back to an input to the gearbox 110. It will be further appreciated that to enter the lash zone all wind-up has to be eliminated from the driveline before the lash zone can be entered and so any small variations in notional input shaft speed due to variations in wind-up can be ignored.

The manner in which autonomous coasting control system operates to transition the motor vehicle MV between driven and coasting modes of operation will now be described in more detail with reference to FIGS. 3 to 7.

In order to achieve a smooth low shuffle transition from a driving state to a coasting state the electronic controller 130 is programmed with a control strategy having three different control functions that are activated in specific driveline states in order to improve the behaviour of the driveline.

The three states will now be described with reference to FIG. 3 in which engaged and dis-engaged E-clutch states are shown and the transition from driving to coasting is shown as a series of dashed arrows and the transition from coasting to driving is shown as continuous arrows.

Figure 3:
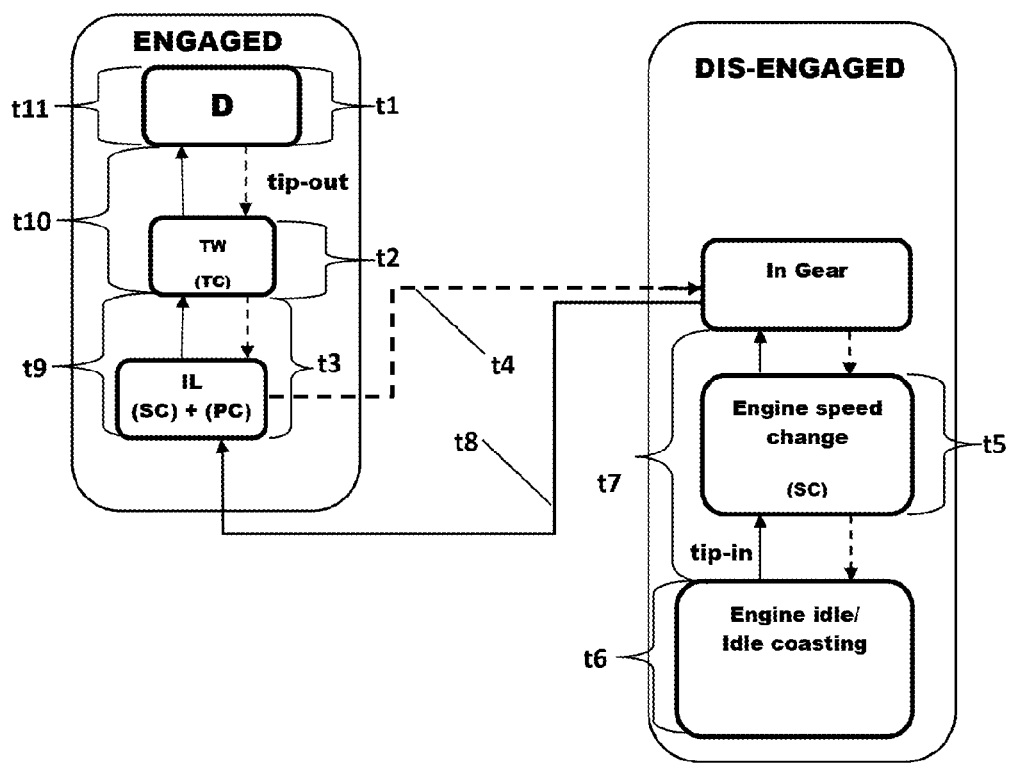
FIG. 3 is a state diagram showing the various steps required to effect a transition from a vehicle driving mode to a vehicle coasting mode and from the vehicle coasting mode back to the vehicle driving mode.

FIG. 3 also indicated when the three control functions described are used to control the various driveline states referenced against the time zones of FIGS. 4A, 4B and 5A and 5B.

When wind-up (TW) has to be built up or released in the driveline, torque control (TC) is used and to control the driveline position and speed in lash (IL), speed control (SC) and position controls (PC) can be used.

Furthermore, speed control (SC) is also activated in some open driveline states with the goal of synchronizing engine speed and actual gearbox input shaft speed to achieve a relative speed of substantially zero before the E-clutch 105 is engaged.

Referring now to FIG. 3, initially the motor vehicle MV is in a driving state (D) in which the vehicle is travelling along a road with the E-clutch 105 engaged and torque is being provided from the engine 100 as requested by a driver of the motor vehicle MV.

After a tip-out event has occurred, indicating that autonomous coasting is desirable, the first control function (TW) is the reduction of torque from the driver demanded level to a lower level. This reduction in engine torque allows for the release of driveline wind-up or twist. In this stage the electronic controller 130 via the torque controller 130T gradually reduces a torque setpoint sent to control the engine 100, that is to say, torque control (TC) is active.

Whenever driveline wind-up needs to be released in the TW state, the engine torque setpoint is ramped from the current value to a target value. The target value depends upon the required transition and, by changing the slope of the torque ramp it is possible to trade off smoothness against transition time.

The next control function speed control (SC) is used to control relative shaft speed between the engine output shaft 104 and a notional input shaft having a rotational speed equal to the speed of the motor vehicle MV projected or referred back to an input end of the driveline and thereby the relative rotational speed in the lash zone. This speed control is accomplished by closed-loop speed control using the engine speed controller 130S and a feedback of engine speed obtained from the input 131 along with an estimate of gearbox input shaft speed obtained from the wheel speed sensor 103 via the wheel speed input 133 along with knowledge of the currently engaged gear from the gear sensor 111 provided by the input 134 and knowledge of the final drive ratio stored in one of the memories 130M of the electronic controller 130.

The notional input shaft speed can, for example, be computed by calculating the gearbox output shaft speed using the wheel speed measurement from the wheel speed sensor 103 and projecting this rotational speed to the notional input shaft by using information obtained from the selected gear sensor 111 about the selected gear.

Note that the actual gearbox input shaft 112 rotates at the same speed as the engine 100 whenever the E-clutch 105 is in the engaged state but there can be a difference in speed between the engine 100 and the notional input shaft due to the presence of lash. This is because the driveline lash exists between the actual gearbox input shaft 112 and the driven wheels 102. It is therefore possible to get a small rotational speed difference between the actual rotational speed of the gearbox input shaft 112 and the calculated rotational speed for the notional input shaft that is based upon the speed of the motor vehicle MV and the various ratios between the driven wheels 102 and the notional input shaft.

It will be appreciated that the drivetrain will be moving through the lash zone (IL) if there is a speed difference when the E-clutch 105 is in the engaged state between the rotational speed of the engine 100 and the predicted rotational speed of the notional input shaft for the current vehicle speed taking into account all driveline ratios.

This relative speed can be controlled if the speeds of both the engine 100 and the vehicle speed are directly measured or if a reliable estimate based on other measurements is available.

The relative speed can be manipulated by using the engine speed controller 130S to provide engine speed control (SC). Furthermore, by using position control (PC) as provided by the position controller 130P it is possible to stay in the lash zone (IL) by keeping the rotational speed of the engine 100 and the rotational speed of the notional input shaft when in the lash zone substantially the same so that the relative speed therebetween is substantially zero.

Controlling position in the lash zone (IL) over time can be computed by integrating the relative speed between the engine output speed and the notional input shaft speed over time and the estimate of position can then be used by the position controller 130P to produce a position control loop.

Position control (PC) used to keep the driveline in the lash zone despite disturbances acting on the driveline and, furthermore, can be used to improve the crossing or traversing of the lash zone by adapting the relative speed between the engine 100 and the notional input shaft based upon the position in the lash zone. For example, the relative speed therebetween at the end of the lash zone can be reduced so as to achieve a desired low impact signature.

As shown in FIG. 3 when the driveline is in the lash zone (IL) a transition to a clutch disengaged state is made with the gearbox 110 remaining in the same gear.

After the E-clutch 105 has been disengaged, the speed of the engine 100 is reduced by the engine speed controller 130S until it reaches idle speed at which point the motor vehicle MV is said to be in an idle coasting state.

In some embodiments the engine 100 will then be stopped but in other it remains idling in either case fuel is saved by the lower engine speed and the fact that no driving torque has to be provided by the engine 100.

FIGS. 4A and 4B show graphically the transition from a driving state D in which, in this case, the motor vehicle MV is accelerating to an idle coasting state.

The initial driveline state is acceleration and the motor vehicle MV is moving forward propelled by the engine 100 with the E-clutch in an engaged state and the gearbox 110 in-gear.

In time zone (t1) shown on FIGS. 3, 4a, and 4b, the driveline is accelerating until at the end of the time zone t1 an accelerator pedal tip-out triggers transition to the wind-up release state (TW).

In FIG. 4A the torque demand of the driver is shown as line TD and the actual engine torque TA is shown by a broken line. In FIG. 4B the notional input shaft speed is shown by the line ISS and engine speed is shown by the broken line ES.

In a second time zone t2, torque control (TC) is used to ramp down the engine torque TA to gradually release the wind-up or driveline twist thereby preparing the driveline for lash zone entry.

In time zone t3, the speed controller 130S takes over to effect speed control (SC) and moves the driveline into the lash zone (IL) by controlling the speed of the engine 100. When it is estimated that the driveline is in the lash zone (IL) and preferably close to a mid-lash position, the relative speed between the engine 100 and the motor vehicle MV as referred back to the notional input shaft is reduced to zero and the position controller 130P is enabled to effect position control (PC) that supports the speed controller 130S to maintain the driveline in the lash zone (IL). It is desirable to maintain the driveline in the lash zone (IL) for a few seconds to allow for a driver change of mind situation such as, for example, the driver pressing the accelerator pedal or pressing on a clutch pedal or pressing on a brake pedal all of which would prevent to the use of autonomous coasting control.

In time zone t4 the E-clutch 105 is disengaged by sending the appropriate command from the clutch controller 130C to actuators used to disengage it. Because the E-clutch 105 opening takes place in the lash zone IL substantially no shuffle or torque disturbance is caused.

In time zone t5, the engine speed is reduced to idle speed in a controlled fashion and the motor vehicle MV is then in the idle coasting state in which the rotational speed of the gearbox input shaft 112 will gradually decline if the motor vehicle MV is on level ground or an incline.

The benefits of such an autonomous coasting control strategy is the avoidance of driveline disturbances because driveline states as well as transitions between closed driveline states are controlled. Furthermore, because the transition to an open driveline happens after shaft speeds have been synchronized, no torque disturbance can be generated during clutch disengagement thereby allowing the use of less complex actuation means in terms of actuators and sensing for the E-clutch thereby saving costs and reducing system complexity.

FIG. 3 also shows by way of solid arrows the transition from the idle coasting state to the driving state (D) and FIGS. 5A and 5B show graphically the transition from the coasting state to the driving state in which in this case the motor vehicle MV is accelerating.

As before, in FIG. 5A the torque demand of the driver is shown as line TD and the actual engine torque TA is shown by a broken line and in FIG. 5b the notional input shaft speed is shown by the line ISS and engine speed is shown by the broken line ES.

To initiate a return to the driving mode from the idle coasting mode the driver demands engine by pressing the accelerator pedal (a torque tip-in). The goal of the control strategy is to move the driveline from the idle coasting state to the driving state (D) in a smooth fashion thereby avoiding vehicle shuffle.

The initial condition is idle coasting, the motor vehicle MV is moving forward with an open driveline and the engine 100 is idling with a gear of the gearbox selected and this is indicated as time zone t6 on FIGS. 3, 5a and 5b.

The driver initiated torque tip-in triggers the transition from idle coasting to an engine speed change state indicated as time zone t7 on FIGS. 3, 5a and 5b. In time zone t7 the engine shaft speed is increased and synchronized with the calculated notional input shaft speed by the speed controller 130S.

In time zone t8 engagement of the E-clutch 105 is triggered once both shaft speeds are synchronized. Ideally, the E-clutch 105 will be pre-stroked to minimize the time to reach torque capacity. The driveline will transition to the in-lash state but with an unknown position in the lash zone (IL).

In time zone t9 the lash zone (IL) is crossed in a controlled fashion using the speed controller 130S. The speed controller 130S accelerates the engine 100 until the relative speed reaches a target value $ES_{Target}$. Then, the driveline then traverses the lash zone with a low speed.

Since the position in the lash zone is unknown and cannot easily be measured, the end of the lash zone has to be detected by looking for an impact signature that is a change or spike in engine torque that occurs at the end of time zone t9 on FIG. 5A. Once this impact signature has been detected, it can be concluded that the lash zone has been traversed and a non-lash state exists.

Then in time zone t10 the engine output torque is ramped up in a controlled manner by the torque controller 130T thereby increasing wind-up in the driveline. When a target value is achieved corresponding to a current torque demand of a driver of the motor vehicle MV, control of the engine 100 handed over to the driver at the end of time zone t10.

As before, driveline disturbances are minimized since the transitions between closed driveline states are controlled and the transition from an open to closed driveline happens after shaft speeds have been synchronized and so no significant torque disturbance is generated during clutch re-engagement.

It will be appreciated that the control methodology can be adapted to take into account, for example, the aggressiveness of the driver torque tip-in (rate of change of accelerator pedal position).

For example, a speed bias can be added to the engine speed target in time zone t7 so that the engine speed is controlled to a value slightly higher than the notional input shaft speed. After clutch re-engagement, this ensures that the driveline is at or close to the end of lash and ready for the build-up of twist (wind-up) needed for acceleration. Therefore, in response to an aggressive torque tip-in, time can be saved during the transition to the driving state at the expense of vehicle shuffle leading to a more responsive vehicle.

t will be appreciated that when the motor vehicle MV is coasting, it will decelerate due to air drag and friction. This will lead to a decrease in the rotational speed of gearbox input shaft 112. If the input shaft speed drops below the idle speed of the engine while the E-clutch 105 is dis-engaged then driveline disturbances cannot be avoided when the E-clutch 105 is engaged. To avoid this situation, if the input shaft speed crosses a rotational speed threshold from above and the driver remains passive, i.e. does not press any pedal, the motor vehicle MV will automatically transition to an idle drive state.

In the idle drive state, the E-clutch 105 is in an engaged state and the engine 100 operates at idle speed controlled by an idle speed controller. Thus, torque is transmitted through the drivetrain and the situation is similar to the normal drive state (D) except that torque is not demanded by the driver but by the idle speed controller and the torque demand is not very high.

The steps required to transition from idle coasting to idle drive are the same as those for a transition from idle coasting to drive and so will not be described again.

Figure 6:
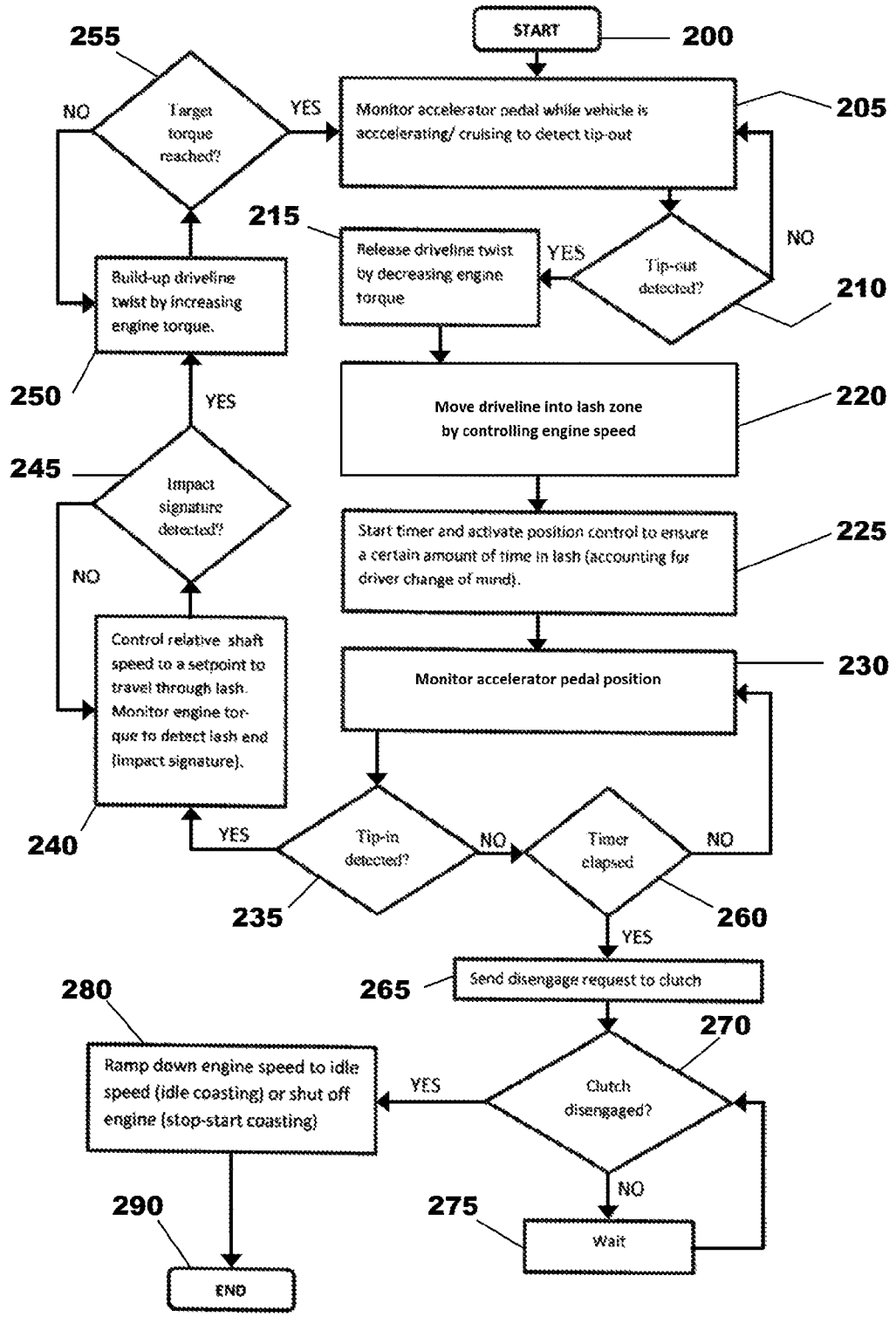
FIG. 6 is a flow chart showing various steps performed by the control system shown in FIGS. 2A and 2C to transition the motor vehicle from a driving mode of operation to a coasting mode of operation.

With Reference to FIG. 6 there is shown the basic steps performed by the electronic controller 130 in order to transition from the driving state to the idle coasting state or an engine shut-off state corresponding to the transition shown in FIG. 3.

The method starts in box 200 where the engine 100 is running the E-clutch 105 is engaged and the motor vehicle MV is travelling in-gear above a predefined minimum vehicle speed.

As indicated in box 205 the electronic controller 130 is continuously monitoring the position of the accelerator pedal via the input signal 136 it receives from the accelerator pedal sensor 150. If, in box 210, a tip out is detected, then the method advances from box 210 to box 215 otherwise the electronic controller 130 continues to monitor the accelerator pedal waiting for a torque tip-out to occur.

In box 215 the torque controller 130T is operable to reduce the torque produced by the engine 100 in a controlled manner so that the torque output ramps down thereby reducing wind-up in the driveline until, as indicated in box 220, the driveline has moved into the lash zone. The engine speed controller 130S is used to vary the speed of the engine 100 to produce a speed difference between the engine 100 and the speed of the motor vehicle MV projected back to a notional input shaft so as to allow the lash zone to be entered. When the lash zone has been entered a small time delay of a few seconds is provided in box 225 by starting a timer and in box 230 the position controller 130P maintains the driveline in the lash zone while monitoring the position of the accelerator pedal to make sure that a torque tip-in event has not occurred. The position of the clutch pedal may also be checked at this stage along with the speed of the motor vehicle MV to ensure that it is acceptable to continue with an automated transition to a coasting state. It will be appreciated that if the driver depresses the clutch pedal or the speed of the motor vehicle MV drops below the minimum permitted vehicle speed automatic coasting is not permitted and the method will end.

If when checked in box 235 a torque tip-in has occurred, then the method advances to box 240 where the engine speed controller 130S moves the driveline back through the lash zone until a characteristic impact signature is detected (a small increase in required engine torque to maintain the same speed) in box 245. If no impact signature is detected it indicates that the driveline is still traversing the lash zone and the method returns to box 240 from box 245.

When the impact signature is detected in box 245 the method advances to box 250 where the engine torque controller 130T ramps up the engine output torque to increase wind-up in the driveline and, when in box 255 a target torque level has been reached, the method returns to box 205.

If, when checked in box 255, the target torque level has not been reached the method returns to box 250 and box 250 is executed again. The boxes 250 and 255 are cycled around until the test in box 255 is passed.

Referring back to box 235, if no torque tip-in has been detected, the method advances to box 260 to check whether the timer has elapsed and, if it has not, the method returns to box 230 and, if it has, the method advances to box 265.

In box 265 disengagement of the E-clutch 105 is commenced by the clutch controller 130C and then in box 270 it is checked whether the E-clutch 105 is dis-engaged. If the E-clutch 105 is not dis-engaged a short delay of a few milleseconds is provided in box 275 before the engagement state of the E-clutch 105 is re-checked in box 270. The boxes 270 and 275 are repetitively executed until eventually the state of the E-clutch 105 is confirmed to be dis-engaged. This monitoring can be achieved by any suitable means such as, for example, a displacement sensor associated with a clutch actuator.

When the E-clutch 105 is dis-engaged the method advances from box 270 to box 280 where the engine speed controller 130S ramps down the speed of the engine to idle speed or in some cases automatically shuts down the engine 100. It will be appreciated that when the engine 100 reaches idle speed a conventional idle speed controller can be used to maintain the engine 100 at idle speed.

The method then advances from box 280 to box 290 where it ends. The state of the motor vehicle MV has therefore been automatically transitioned from the driving state to a coasting state by the electronic controller 130 without driver control.

Figure 7:
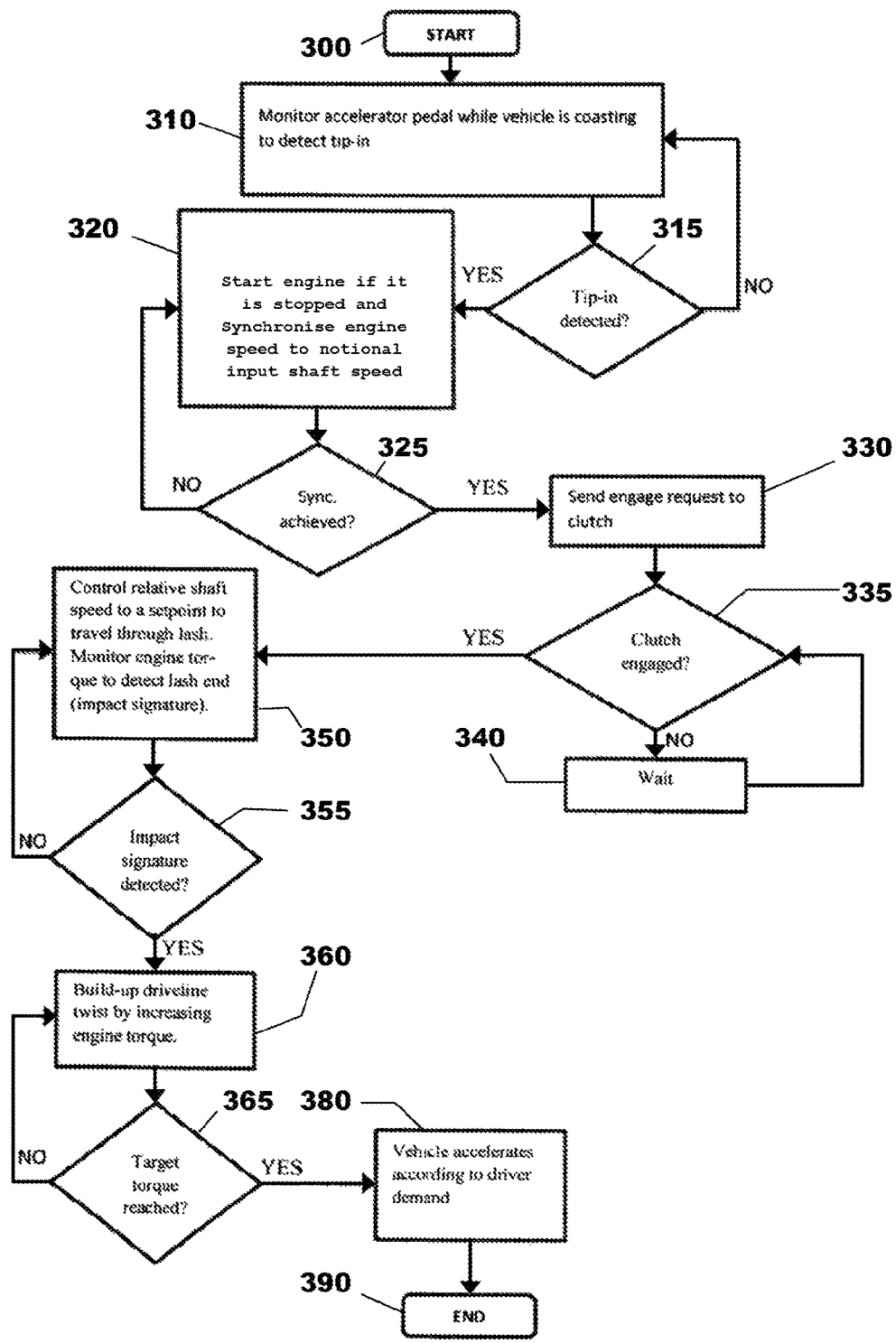
FIG. 7 is a flow chart showing various steps performed by the control system shown in FIGS. 2A and 2C to transition the motor vehicle from a coasting mode of operation to a driving mode of operation.

With Reference to FIG. 7 there are shown basic steps performed by the electronic controller 130 in order to transition from a coasting state to a driving state corresponding to the transition shown in FIG. 3

The method starts in box 300 where the engine 100 is in this case idling, the E-clutch 105 is dis-engaged and the vehicle is travelling in-gear above the predefined minimum vehicle speed.

In box 310 the position of the accelerator pedal is continuously monitored using the input 136 from the accelerator pedal sensor 150. If in box 315 a torque tip-in is detected the method advances from box 315 to box 320 otherwise it continues to cycle around the boxes 310 and 315.

In box 320 the engine 100 is started if it is currently in a shut-down state and then the engine speed controller 130S is operable to synchronize the engine speed with the current speed of the motor vehicle MV projected back to the gearbox input shaft 112 by calculating a target engine speed (notional input shaft speed) and then controlling the speed of the engine 100 to attain this target speed. It will be appreciated that the inputs 133, 134 from the road wheel sensor 103 and the selected gear sensor 111 respectively can be used along with data relating to the driveline ratios to produce a gearbox input shaft speed value corresponding to the current vehicle speed. It will also be appreciated that an allowance may be made for the rate of deceleration of the motor vehicle during the transition when calculating a target engine speed.

The current engine speed is compared to the calculated target engine speed in box 325 to ascertain whether synchronization has been achieved. If synchronization has been achieved (engine speed=target engine speed=notional input shaft speed) the method advances to box 330 otherwise the method returns to box 320 and the boxes 320 and 325 are cycled through until the test in box 325 is passed.

In box 330 the clutch controller 130C is operable to commence engagement of the E-clutch 105 and then in box 335 it is checked whether the E-clutch 105 is engaged. If the E-clutch 105 is not engaged a short delay of a few mille seconds is provided in box 340 before the engagement state of the E-clutch 105 is rechecked in box 335. The boxes 335 and 340 are repetitively executed until eventually the state of the E-clutch 105 is confirmed to be engaged. As before, this monitoring can be achieved by any suitable means such as, for example, a displacement sensor associated with a clutch actuator.

When the E-clutch 105 is confirmed in box 335 to be engaged, the method advances to box 350 where the engine speed controller 130S controls the speed of the engine 100 so as to cause the driveline to traverse the lash zone.

In box 355 it is checked whether an impact signature indicating that the driveline has traversed the lash zone has been detected. This impact signature can be detected by monitoring the torque output from the engine 100 required to meet the current speed demand of the engine speed controller 130S. When the end of the lash zone is reached there will be a small but discernable increase in the torque required to maintain the desired engine speed indicating that the end of the lash zone has been reached.

If no impact signature has been detected in box 355 the method returns to box 350 and the boxes 350 and 355 are cycled through until an impact signature is detected at which point the method advances to box 360.

In box 360 the engine torque controller 130T ramps up the torque output from the engine 100 in a controlled manner to increase wind-up in the driveline. In box 365 it is checked whether the current torque output of the engine 100 is equal to a target torque corresponding to a torque request from the driver. If the current torque output is less than the target torque the method returns to box 360 and the engine torque controller 130T is operable to continue to ramp up the torque output from the engine 100. However, if when checked in box 365, the current torque output from the engine 100 is the same as the target torque then the method advances from box 365 to box 380 where automatic control of the engine 100 ceases and control of the engine 100 reverts to driver control thereby ending the method as indicated in box 390.

Figure 8:
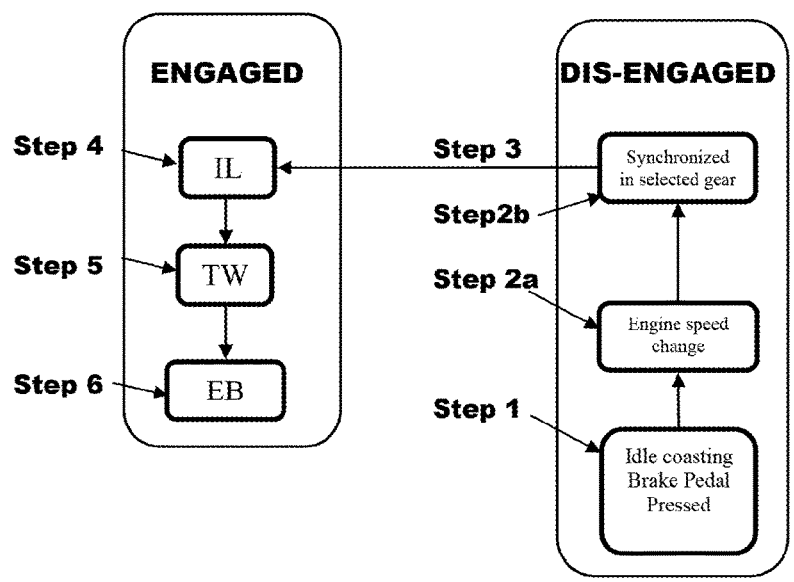
FIG. 8 is a state diagram showing the various steps required to effect a transition from a vehicle coasting mode to an engine braking mode of operation.
Figure 2D:
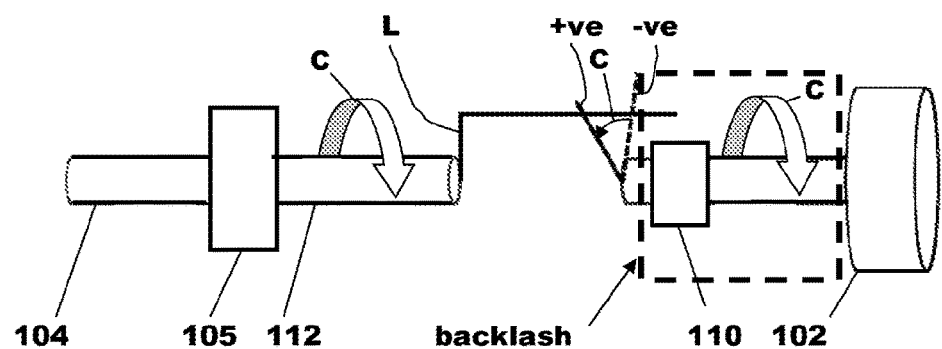
FIG. 2D is a diagrammatic representation of the driveline showing the lash zone of FIG. 2B.

With particular reference to FIG. 8 there is shown the basic steps in the form of a state diagram of an automatic transition from idle coasting to engine braking. Engine braking is a resistive drive mode of operation of the motor vehicle MV in which the E-clutch is engaged and the engine is used to provide braking to the motor vehicle MV.

The initial condition is idle coasting, in which the motor vehicle MV moving forward in-gear with an open driveline (E-clutch disengaged) and the engine 100 idling.

When the driver presses the brake pedal of the motor vehicle MV an automatic control strategy is used to transition the motor vehicle MV from the idle coasting state to an engine braking state (EB) in a smooth fashion, that is to say, avoiding significant shuffle.

In step 1, the drivetrain is in idle coasting state with the E-clutch 105 in a disengaged state and the engine 100 is idling. When the driver presses the brake pedal this triggers a transition from the idle coasting state to an engine speed change state.

In steps 2a and 2b, the engine speed is synchronized by the engine speed controller 130S with a notional input shaft speed (target speed) based upon the current speed of the motor vehicle MV.

In step 3 engagement of the E-clutch 105 is triggered, as soon as the engine and gearbox input shaft speeds are synchronized (step 2b). Ideally, the E-clutch 105 is pre-stroked to minimize the time to reach torque capacity. The driveline transitions to the in-lash state, but the position within the lash zone (IL) is unknown.

In step 4, the lash zone (IL) is crossed in a controlled manner using the engine speed controller 130S. The engine speed controller 130S is operable to decelerate the engine 100 until a target value based upon the rotational speed of a notional input shaft speed calculated from the current vehicle speed and knowledge of the gearing of the components of the driveline is reached. The controlling of the engine 100 enables the driveline to traverses the lash zone at a small but constant speed.

As before, because the position in the lash zone is unknown and cannot be measured, the end of the lash zone has to be detected by looking for an impact signature. Once the impact signature has been detected it is known that the lash zone has been traversed and step 5 is triggered.

In step 5, negative driveline wind-up is increased in a controlled manner using the engine torque controller 130T to ramp down the torque demand to the engine 100 until a maximum drag torque is reached. It will be appreciated that because the wind-up is negative, to increase wind-up requires the torque output from the engine 100 to be reduced. In some cases the inlet and outlet valves of the engine are controlled to increase the pumping losses thereby further increasing the engine braking effect.

As before, driveline disturbances are reduced or avoided because transitions between closed driveline states are carefully controlled. Furthermore, the transition from an open to a closed driveline happens after engine and gearbox input shaft speeds have been synchronized. Thus, no significant torque disturbance is generated during re-engagement of the E-clutch 105.

By slightly reducing the engine speed target such that the engine speed target is slightly less than the notional input shaft speed in the synchronization step (Step 2), the resulting relative speed between engine and the gearbox input shaft 112 will lead to lash zone crossing during re-engagement of the E-clutch 105. This has the effect that wind-up can start earlier but at the expense of increased shuffle.

Figure 9:
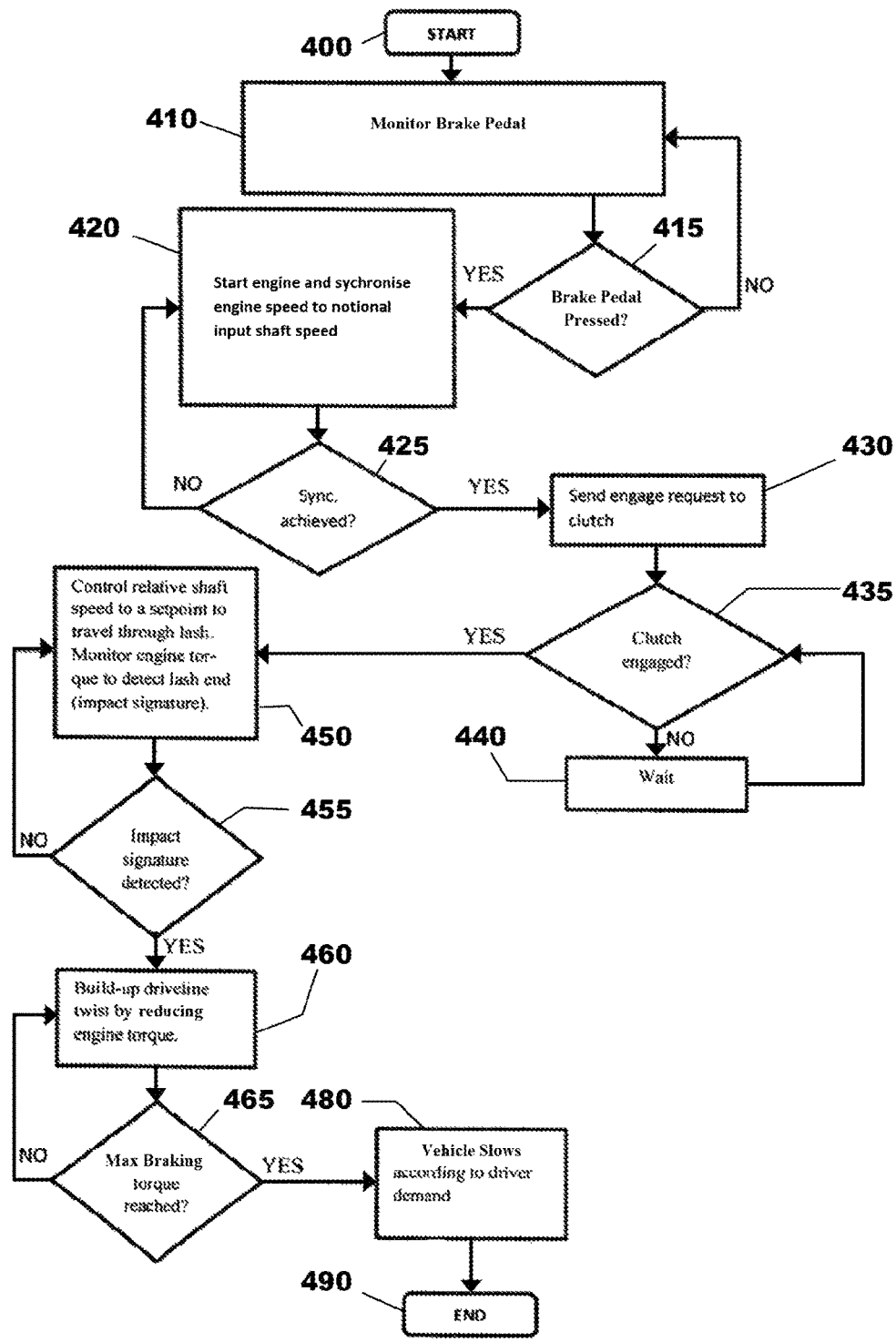
FIG. 9 is a flow chart corresponding to the state diagram of FIG. 8 showing various steps performed by the control system shown in FIGS. 2A and 2C to transition the motor vehicle from a coasting mode of operation to an engine braking mode of operation.

With Reference to FIG. 9 there are shown the basic steps performed by the electronic controller 130 in order to transition from the coasting state to an engine braking state as previously described with reference to FIG. 8.

The method commences in box 400 and then in box 410 continues with the continuous monitoring of the brake pedal of the motor vehicle MV that is achieved by monitoring the input 137 to the electronic controller 130 from the brake pedal sensor 160.

If when checked in box 415 it is confirmed that the brake pedal has been pressed the method advances to box 420 otherwise it returns to box 410 and boxes 410 and 415 are cycled through again.

In box 420 the engine 100 is started if it is currently in a shut-down state and then the engine speed controller 130S is operable to synchronize the engine speed with a target speed based upon the current speed of the motor vehicle MV projected back to the gearbox input referred to herein as a notional input shaft speed.

The current engine speed is compared to the calculated target engine speed in box 425 to ascertain whether synchronization has been achieved. If synchronization has been achieved the method advances to box 430 otherwise the method returns to box 420 and the boxes 420 and 425 are cycled through until the test in box 425 is passed.

In box 430 the clutch controller 130C is operable to commence engagement of the E-clutch 105 and then in box 435 it is checked whether the E-clutch 105 is engaged. If the E-clutch 105 is not engaged a short delay of a few milleseconds is provided in box 440 before the engagement state of the E-clutch 105 is rechecked in box 435. The boxes 435 and 440 are repetitively executed until eventually the state of the E-clutch 105 is confirmed to be engaged. As before, this monitoring can be achieved by any suitable means such as, for example, a displacement sensor associated with a clutch actuator.

When the E-clutch 105 is confirmed in box 435 to be engaged, the method advances to box 450 where the engine speed controller 130S controls the speed of the engine 100 so as to cause the driveline to traverse the lash zone. In box 455 it is checked whether an impact signature indicating that the driveline has traversed the lash zone has been detected. This can be detected by monitoring the torque output from the engine 100 required to meet the speed demand of the engine speed controller 130S. When the end of the lash zone is reached there will be a small but discernable increase in the torque required to maintain the current engine speed.

If no impact signature has been detected in box 455, the method returns to box 450 and the boxes 450 and 455 are cycled through until an impact signature is detected at which point the method advances to box 460.

In box 460 the engine torque controller 130T ramps down the torque output from the engine 100 in a controlled manner to increase −ve wind-up in the driveline. In box 465 it is checked whether the current torque output of the engine 100 is equal to a target maximum braking torque available from the engine 100. If the current engine braking torque is less than the target braking torque the method returns to box 460 from box 465 and the engine torque controller 130T is operable to continue to ramp down the torque output from the engine 100. However, if when checked in box 465, the current braking torque from the engine 100 is the same as the target maximum braking torque then the method advances to box 480 where automatic control of the engine 100 ceases and control of the motor vehicle MV reverts to driver control causing the motor vehicle MV to slow thereby ending the method as indicated in box 490.

Therefore in summary the problem is the automatic transitioning of a motor vehicle having a manual transmission and E-clutch from current operating mode (e.g. acceleration) to a coasting mode such as idle coasting without producing jerks and longitudinal vehicle shuffle.

The solution provided by the invention is:
  to use a driveline control strategy including feedback control that guarantees a smooth transition from an engaged clutch state to a dis-engaged clutch state allowing a transition from drive to idle coasting and vice-versa;
  to measure engine speed and estimate input shaft speed based on wheel speed as part of the control strategy to allow a lash zone to be traversed in a controlled manner;
  to manipulate engine torque as part of the control strategy to reduce or increase driveline wind-up in a controlled manner; and
  to control clutch dis-engagement and engagement as part of the control strategy such that it occurs during a driveline lash state in which torque cannot be transmitted by the driveline.

One of the advantages of the invention is that the control architecture used for the E-clutch can be very simple as the E-clutch is on engaged or dis-engaged in the lash zone. This contrasts with the control architecture required in the case of for example a twin clutch transmission where the clutch is disengaged and engaged while in a driving state.

Although the invention is particularly advantageous in the case of a transmission having a driver operated E-clutch and a manual transmission it will be appreciated that it could be applied with benefit to a two pedal motor vehicle having and automatically controlled drive clutch and a semi-automatic transmission.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a motor vehicle having an engine driveably connected to an input of a driveline via an electronically controlled clutch, the method comprising:
  while the motor vehicle is in a drive mode of operation,
    in response to an indication that coasting is desirable, automatically transitioning to a coasting mode of operation by controlling the engine to move the driveline into a lash state in which no torque is being transmitted by the driveline and, while the driveline is in the lash state, automatically disengaging the electronically controlled clutch; and
  operating the motor vehicle in the coasting mode of operation.

2. The method of claim 1 wherein the indication that coasting is desirable is a tip-out of torque demand by a driver of the motor vehicle.

3. The method of claim 1 wherein controlling the engine to move the driveline into the lash state comprises:
  reducing a torque output from the engine to reduce wind-up in the driveline; and
  after the wind-up in the driveline has been eliminated, controlling a rotational speed of the engine to move the driveline into the lash state.

4. The method of claim 3 further comprising controlling the rotational speed of the engine to maintain the driveline in the lash state for a minimum period of time before disengaging the electronically controlled clutch.

5. The method of claim 1 further comprising controlling a rotational speed of the engine at an idle speed while the motor vehicle is in the coasting mode of operation.

6. The method of claim 5 further comprising, in response to tip-in of torque demand by a driver of the motor vehicle, automatically transitioning from the coasting mode of operation to the drive mode of operation by:
  controlling the rotational speed of the engine to synchronize it with a rotational speed of the input to the driveline;

upon achieving synchronization of the rotational speed of the engine and the rotation speed of the input to the driveline, engaging the electronically controlled clutch;

after the electronically controlled clutch is engaged, increasing a torque output from the engine in a controlled manner to produce wind-up in the driveline;

continuing to increase the torque output from the engine until a predefined level of torque has been attained; and operating the motor vehicle in the drive mode of operation.

7. The method of claim 5 further comprising, in response to a request for engine braking, automatically transitioning the motor vehicle from the coasting mode of operation to a resistive drive mode of operation by:

controlling the rotational speed of the engine to synchronize it with a rotational speed of the input to the driveline;

upon achieving synchronization of the rotational speed of the engine and the rotation speed of the input to the driveline, engaging the electronically controlled clutch;

after the electronically controlled clutch is engaged, reducing a torque request to the engine to zero; and operating the motor vehicle in the resistive drive mode of operation.

8. The method of claim 1 further comprising shutting-down the engine while in the coasting mode of operation.

9. The method of claim 8 further comprising, in response to tip-in of torque demand by a driver of the motor vehicle, automatically transitioning the motor vehicle from the coasting mode of operation to the drive mode of operation by:

starting the engine;

controlling a rotational speed of the engine to synchronize it with a rotational speed of the input to the driveline;

upon achieving synchronization of the rotational speed of the engine and the rotation speed of the input to the driveline, engaging the electronically controlled clutch;

after the electronically controlled clutch is engaged, increasing a torque output from the engine in a controlled manner to produce wind-up in the driveline;

continuing to increase the torque output from the engine until a predefined level of torque has been attained; and operating the motor vehicle in the drive mode of operation.

10. A motor vehicle comprising:

an engine selectively connected to an input to a driveline by an electronically controlled clutch;

an accelerator pedal sensor to provide a signal indicative of a driver torque demand; and an electronic controller to control operation of the engine and engagement of the electronically controlled clutch programmed to automatically transition the motor vehicle from a drive mode of operation to a coasting mode of operation in response to the signal from the accelerator pedal sensor indicating that a torque demand tip-out has occurred by:

controlling the engine to move the driveline into a lash state in which no torque is being transmitted by the driveline, and while the driveline is in the lash state, automatically disengaging the electronically controlled clutch to enter the coasting mode of operation.

11. The vehicle of claim 10 wherein the electronic controller is programmed to control the engine to move the driveline into the lash state by:

decreasing, in a controlled manner, a torque output from the engine to remove wind-up from the driveline; and after the wind-up has been removed from the driveline, controlling a rotational speed of the engine to move the driveline into the lash state.

12. The vehicle of claim 10 wherein the electronic controller is further programmed to transition the motor vehicle from the coasting mode of operation to the drive mode of operation in response to the signal from the accelerator pedal sensor indicating that a torque demand tip-in has occurred by:

controlling a rotational speed of the engine to synchronize it with a rotational speed of the input to the driveline; and upon achieving synchronization of the rotational speed of the engine and the rotation speed of the input to the driveline, engaging the electronically controlled clutch;

after the electronically controlled clutch is engaged, increasing a torque output from the engine in a controlled manner to produce wind-up in the driveline;

continuing to increase the torque output from the engine until a predefined level of torque has been attained; and operating the motor vehicle in the drive mode of operation.

13. The vehicle of claim 10 wherein the electronic controller is programmed to detect an impact signature indicating that the driveline has traversed from the lash state to a non-lash state.

14. A method of controlling a motor vehicle comprising:

while in a drive mode of operation, responding to a tip-out of torque demand by controlling an engine to move a driveline into a lash state and then, while the driveline is in the lash state, automatically disengaging an electronically controlled clutch to transition into a coasting mode of operation; and operating in the coasting mode of operation.

15. The method of claim 14 wherein controlling the engine to move the driveline into the lash state comprises:

reducing a torque output from the engine to reduce wind-up in the driveline;

after the wind-up in the driveline has been eliminated, controlling a rotational speed of the engine to move the driveline into the lash state; and controlling the rotational speed of the engine to maintain the driveline in the lash state for a minimum period of time before disengaging the electronically controlled clutch.

16. The method of claim 14 further comprising controlling a rotational speed of the engine at an idle speed while the motor vehicle is in the coasting mode of operation.

17. The method of claim 16 further comprising, in response to tip-in of torque demand:

controlling the rotational speed of the engine to synchronize it with a rotational speed of an input to the driveline;

upon achieving synchronization of the rotational speed of the engine and the rotation speed of the input to the driveline, automatically engaging the electronically controlled clutch;

after the electronically controlled clutch is engaged, increasing a torque output from the engine in a controlled manner to produce wind-up in the driveline;

continuing to increase the torque output from the engine until a predefined level of torque has been attained; and operating the motor vehicle in the drive mode of operation.

18. The method of claim 16 further comprising, in response to a request for engine braking:

controlling the rotational speed of the engine to synchronize it with a rotational speed of an input to the driveline;

upon achieving synchronization of the rotational speed of the engine and the rotation speed of the input to the driveline, automatically engaging the electronically controlled clutch;

after the electronically controlled clutch is engaged, reducing a torque request to the engine to zero; and operating the motor vehicle in a resistive drive mode of operation.

19. The method of claim 14 further comprising shutting-down the engine while in the coasting mode of operation.

20. The method of claim 19 further comprising, in response to tip-in of torque demand:

starting the engine;

controlling a rotational speed of the engine to synchronize it with a rotational speed of an input to the driveline;

upon achieving synchronization of the rotational speed of the engine and the rotation speed of the input to the driveline, automatically engaging the electronically controlled clutch;

after the electronically controlled clutch is engaged, increasing a torque output from the engine in a controlled manner to produce wind-up in the driveline;

continuing to increase the torque output from the engine until a predefined level of torque has been attained; and operating the motor vehicle in the drive mode of operation.

* * * * *